(12) United States Patent
Doumae et al.

(10) Patent No.: US 11,489,552 B2
(45) Date of Patent: Nov. 1, 2022

(54) AIR CONDITIONING SYSTEM

(71) Applicant: DAIKIN INDUSTRIES, LTD., Osaka (JP)

(72) Inventors: Hiroshi Doumae, Osaka (JP); Shin Higashiyama, Osaka (JP); Yasuyuki Aisaka, Osaka (JP); Tsutomu Iura, Osaka (JP); Hiroki Ueda, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/976,272

(22) PCT Filed: Mar. 1, 2019

(86) PCT No.: PCT/JP2019/008156
§ 371 (c)(1),
(2) Date: Aug. 27, 2020

(87) PCT Pub. No.: WO2019/168168
PCT Pub. Date: Jun. 9, 2019

(65) Prior Publication Data
US 2021/0006290 A1    Jan. 7, 2021

(30) Foreign Application Priority Data

Mar. 1, 2018   (JP) .............................. JP2018-036611

(51) Int. Cl.
*H04B 3/02*   (2006.01)
*F24F 11/88*   (2018.01)
*F24F 11/54*   (2018.01)

(52) U.S. Cl.
CPC ................ *H04B 3/02* (2013.01); *F24F 11/54* (2018.01); *F24F 11/88* (2018.01)

(58) Field of Classification Search
CPC ... H04B 3/02; F24F 11/54; F24F 11/88; F24F 11/56
See application file for complete search history.

(56) References Cited

U.S. PATENT DOCUMENTS

| 8,494,038 B2 | 7/2013 | Gruendler et al. |
| 2008/0304577 A1 | 12/2008 | Koga et al. |

(Continued)

FOREIGN PATENT DOCUMENTS

| CN | 101682368 A | 3/2010 |
| CN | 103807976 B | 4/2018 |

(Continued)

OTHER PUBLICATIONS

International Preliminary Report on Patentability and English translation of the Written Opinion of the International Searching Authority, dated Sep. 1, 2020, for International Application No. PCT/JP2019/006156.

(Continued)

*Primary Examiner* — Mohammad Ali
*Assistant Examiner* — Vincent W Chang
(74) *Attorney, Agent, or Firm* — Birch, Stewart, Kolasch & Birch, LLP (57) ABSTRACT

An air conditioning system includes an outdoor unit and an indoor unit connected to the outdoor unit through an air conditioning communication line. The outdoor unit includes: a control unit; a compressor; a fan; a compressor inverter; a fan inverter; a heat exchanger; and valves of various types. The control unit of the outdoor unit has a coupling capacitor and a noise-cutting transformer which are between a communication circuit and the air conditioning communication line.

3 Claims, 7 Drawing Sheets

(56) References Cited

U.S. PATENT DOCUMENTS

| | | | |
|---|---|---|---|
| 2009/0077989 A1* | 3/2009 | Nakajima | F24F 11/62 |
| | | | 62/259.1 |
| 2009/0110096 A1* | 4/2009 | Koga | H04L 5/06 |
| | | | 375/260 |
| 2009/0299532 A1* | 12/2009 | Zyren | H04B 3/546 |
| | | | 700/276 |
| 2010/0245932 A1* | 9/2010 | Shimada | H04N 1/00233 |
| | | | 358/442 |
| 2013/0325191 A1 | 12/2013 | Mukai et al. | |
| 2019/0203968 A1* | 7/2019 | Lee | F24F 11/58 |
| 2021/0006291 A1* | 1/2021 | Yu | H04B 3/54 |
| 2021/0320898 A1* | 10/2021 | Doumae | F24F 11/58 |

FOREIGN PATENT DOCUMENTS

| | | |
|---|---|---|
| JP | S6078241 A | 5/1985 |
| JP | 4-36533 A | 2/1992 |
| JP | 2008-157496 A | 7/2008 |
| JP | 2009-10929 A | 1/2009 |
| JP | 4336142 B2 | 9/2009 |
| WO | WO 2012/114421 A1 | 8/2012 |

OTHER PUBLICATIONS

Internatonal Search Report for International Application No. PCT/JP2019/008156 dated Apr. 9, 2019.
Extended European Search Report for Application No. EP 19760355.8 dated Nov. 11, 2021.

* cited by examiner

AIR CONDITIONING SYSTEM

TECHNICAL FIELD

The present invention relates to an air conditioning system.

BACKGROUND ART

A typical air conditioning system connects an outdoor unit and indoor units to each other by an air conditioning communication line. The outdoor unit includes a compressor and an inverter circuit that drives the compressor. Each of the indoor units includes a control circuit that controls the indoor unit. For example, the noise in the inverter circuit affects a communication signal between the outdoor unit and the indoor unit.

PRIOR ART DOCUMENTS

Patent Documents

Patent Document 1: Japanese Patent No. 4336142

SUMMARY OF THE INVENTION

Problems that the Invention is to Solve

To improve the controllability of the outdoor unit and the indoor unit, it is preferred that the communication speed in the air conditioning communication line be increased. However, since the influence of the noise becomes larger when the communication line is increased as described above, it is difficult to increase the communication speed in the air conditioning communication line and reduce the influence of noise at the same time.

The objective of the present invention is to provide an air conditioning system capable of reducing the influence of noise on high-speed communication.

Means for Solving the Problem

An air conditioning system according to a first aspect includes an outdoor unit (2) including an inverter circuit (13), an indoor unit (3) connected to the outdoor unit (2) in a communicable manner, and a signal adjustment mechanism (22, 23, 42, 43, 153) for communication between the outdoor unit (2) and the indoor unit (3). For a communication signal, the signal adjustment mechanism adjusts the level of a desired frequency band or adjusts a frequency used for communication.

In the air conditioning system of the first aspect, by adjusting the level of a signal component of a frequency corresponding to the inverter circuit in the frequency components of a communication signal or by adjusting the communication signal such that the predetermined frequency band is not used, the influence of noise is reduced to enable high-speed communication, In an air conditioning system according to a second aspect, the signal adjustment mechanism adjusts a signal level included in a predetermined frequency width.

In the air conditioning system of the second aspect, by setting a frequency width with which the level is adjusted, high-speed communication is enabled using a high-frequency signal component.

In an air conditioning system according to a third aspect, the signal adjustment mechanism generates a communication signal that does not include a predetermined frequency width.

In the air conditioning system of the third aspect, by setting a predetermined frequency width in correspondence with entering noise, a communication signal that does not include a frequency width including noise enables high-speed communication without the influence of noise.

In an air conditioning system according to a fourth aspect, the signal adjustment mechanism is activated at a predetermined frequency width. The activation of the signal adjustment mechanism is to adjust the level of a communication signal, and the deactivation of the signal adjustment mechanism is not to adjust the level of a communication signal.

In the air conditioning system of the fourth aspect, by limiting a frequency to be adjusted to a predetermined frequency width, the distortion (deformation) of a signal waveform is limited to enable high-speed communication.

In an air conditioning system according to a fifth aspect, a center frequency of the frequency width with which the signal adjustment mechanism is activated is variable.

In the air conditioning system of the fifth aspect, the adjustment of a signal corresponding to the state of a communication channel (the state of the outdoor unit (2)) is enabled.

An air conditioning system according to a sixth aspect includes a switching mechanism (153, 160) that switches the signal adjustment mechanism between activation and deactivation.

In the air conditioning system of the sixth aspect, a decrease in the communication quality (signal waveform) is limited by switching the signal adjustment mechanism between activation and deactivation in correspondence with the installed state (communication distance, noise level).

In an air conditioning system according to a seventh aspect, the signal adjustment mechanism is provided on at least one of the outdoor unit (2) or the indoor unit (3).

In an air conditioning system according to an eighth aspect, the signal adjustment mechanism includes a noise-cut transformer (23, 43) connected with an air conditioning signal line (6).

MODES FOR CARRYING OUT THE INVENTION

Air conditioning systems according to embodiments of the present invention will now be described. The scope of the present invention is defined not by the detailed description, but by the claims and their equivalents, and all variations within the scope of the claims and their equivalents are to be construed as being included in the disclosure.

First Embodiment

A first embodiment will now be described.

Figure 1:
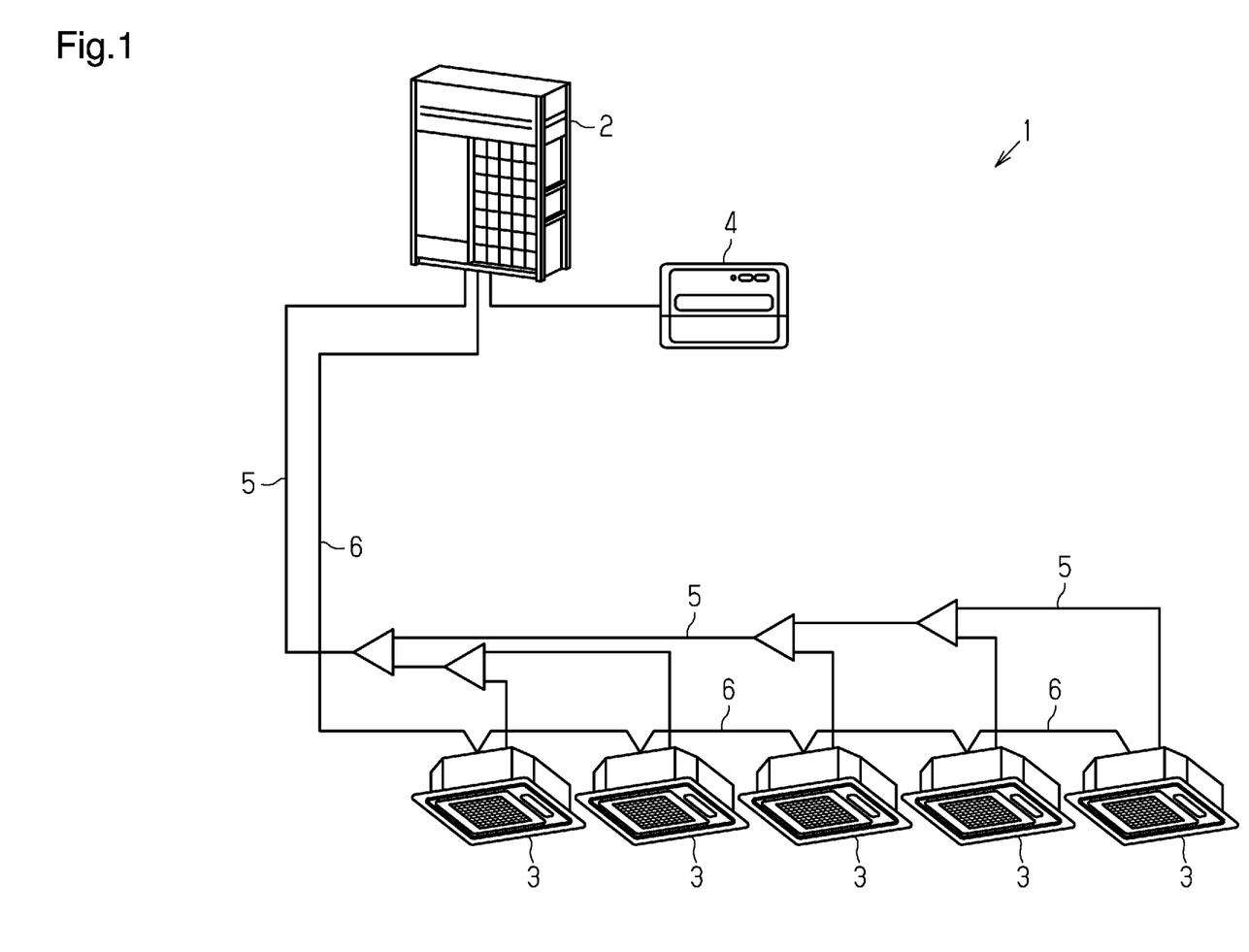
FIG. 1 is a schematic diagram of an air conditioning system according to a first embodiment.

As shown in FIG. 1, an air conditioning system 1 includes an outdoor unit 2, which is arranged outdoors, and indoor units 3, which are arranged indoors. FIG. 1 shows five indoor units 3. The air conditioning system 1 is arranged in, for example, a building such as an office building or a rented building. The outdoor unit 2 is connected to the indoor units 3 by refrigerant pipe 5. In addition, the outdoor unit 2 is connected to the indoor units 3 by an air conditioning communication line 6. The air conditioning system 1 of the present embodiment further includes a system management device 4, which is connected to the outdoor unit 2 by the air conditioning communication line 6. The system management device 4, for example, receives instructions from a user who manages the building such as the office building or the rented building and centrally manages the indoor units 3.

The configuration of the air conditioning system may be changed. For example, one or more indoor units 3 may be connected to the outdoor unit 2. Alternatively, the air conditioning system may include multiple outdoor units 2. As another option, the air conditioning system may include multiple outdoor units 2, and one or more indoor units 3 may be connected to each outdoor unit 2. As an alternative, the system management device 4 may be omitted.

In the air conditioning system 1, it is desired that the controllability of the outdoor unit 2 and the indoor unit 3 be improved. For example, it is required that the outdoor unit 2 and the indoor unit 3 be finely controlled regarding the changes in a setting temperature and the variations in temperature such as room temperature. Thus, the air conditioning system is configured to execute high-speed communication between the outdoor unit 2 and the indoor units 3.

Figure 2:
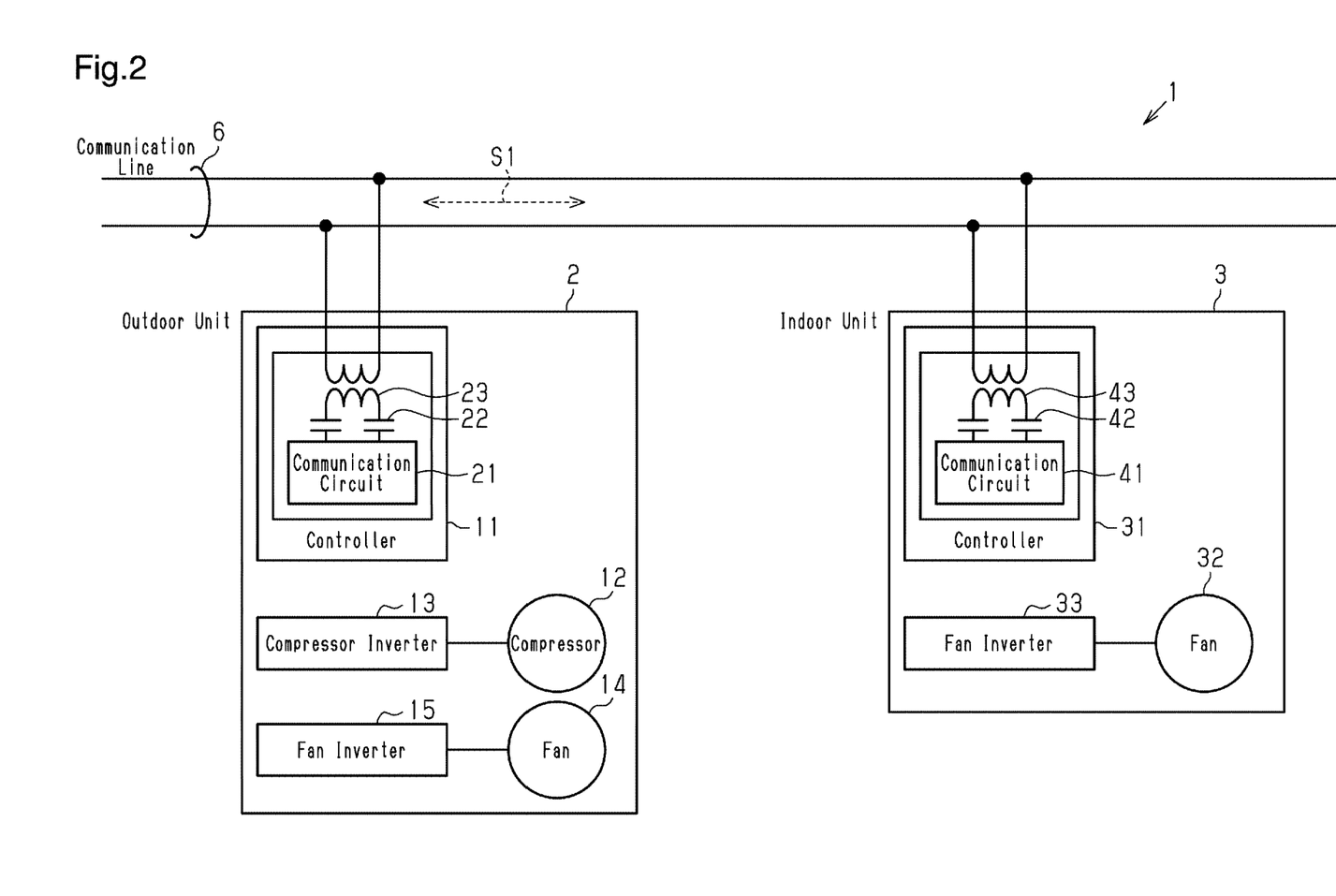
FIG. 2 is a schematic block diagram of the outdoor unit and the indoor unit of the first embodiment.

As shown in FIG. 2, the outdoor unit 2 includes, for example, a controller 11, a compressor 12, a fan 14, a compressor inverter 13, a fan inverter 15, a heat exchanger, and various types of valves.

The compressor 12 is, for example, a positive-displacement compressor such as scroll type compressor or screw type compressor. The compressor 12 draws refrigerant in, compresses the refrigerant, and then discharges the refrigerant. The compressor 12 includes a motor serving as a drive source. The compressor inverter 13 includes a switching element used to drive the motor of the compressor 12. The switching element is, for example, an insulated gate bipolar transistor (IGBT). The controller 11 executes ON/OFF control for the switching element at a predetermined carrier frequency (for example, 6 kHz). The ON/OFF of the switching element drives the compressor 12.

The fan 14 is an air blower system that generates air flow that flows into the outdoor unit 2, passes through the outdoor heat exchanger, and then flows out of the outdoor unit 2. The fan 14 includes a motor serving as a drive source. The fan inverter 15 includes a switching element used to drive the motor of the fan 14. The switching element is, for example, an IGBT. The controller 11 executes ON/OFF control for the switching element of the fan inverter 15. The ON/OFF of the switching element drives the fan 14.

The controller 11 is configured as, for example, a control board on which a microcomputer or the like is implemented. The controller 11 includes a communication circuit 21, a coupling capacitor 22, and a noise-cut transformer 23. The communication circuit 21 communicates with a communication circuit 41 of the indoor unit 3. The communication circuit 21 is connected to the air conditioning communication line 6 via the coupling capacitor 22 and the noise-cut transformer 23.

The communication circuit 21 outputs, to the air conditioning communication line 6 via the coupling capacitor 22 and the noise-cut transformer 23, a communication signal used to transmit operation data. The communication circuit 21 generates a signal used for communication through, for example, orthogonal frequency-division multiplexing (OFDM). Further, the communication circuit 21 receives operation data from a communication signal that is input from the air conditioning communication line 6 via the noise-cut transformer 23 and the coupling capacitor 22. The "operation data" includes, for example, an operating/stopping instruction that is sent from a remote controller or the like and includes temperature information that is obtained by a temperature sensor. Using such operation data, the controller 11 controls the operation frequency of the compressor 12, the opening/closing and switching of various valves, and the like.

The indoor unit 3 includes, for example, a controller 31, a fan 32, a fan inverter 33, a heat exchanger, and an expansion valve. The fan 32 is an air blower system that generates air flow that flows into the outdoor unit 3, passes through the heat exchanger, and then flows out of the outdoor unit 3. The fan 32 includes a motor serving as a drive source. The fan inverter 33 includes a switching element used to drive the motor of the fan 32. The switching element is, for example, an IGBT. The controller 31 executes ON/OFF control for the switching element of the fan inverter 33 and adjusts the rotation speed of the fan 32 to control the flow rate of air flow that is generated.

The controller 31 is configured as, for example, a control board on which a microcomputer or the like is implemented. The controller 31 includes a communication circuit 41, a coupling capacitor 42, and a noise-cut transformer 43. The communication circuit 41 communicates with the communication circuit 21 of the outdoor unit 2. The communication circuit 41 is connected to the air conditioning communication line 6 via the coupling capacitor 42 and the noise-cut transformer 43. The communication circuit 41 outputs, to the air conditioning communication line 6 via the coupling capacitor 42 and the noise-cut transformer 43, a communication signal used to transmit operation data. Further, the communication circuit 41 receives operation data from a communication signal that is input from the air conditioning communication line 6 via the noise-cut transformer 43 and the coupling capacitor 42.

As described above, the communication circuit 21 of the outdoor unit 2 is connected to the air conditioning communication line 6 via the coupling capacitor 22 and the noise-cut transformer 23. The coupling capacitor 22 and the noise-cut transformer 23 are set in correspondence with the noise superimposed on the communication signal.

The generation and superimposition of noise will now be described.

Figure 3:
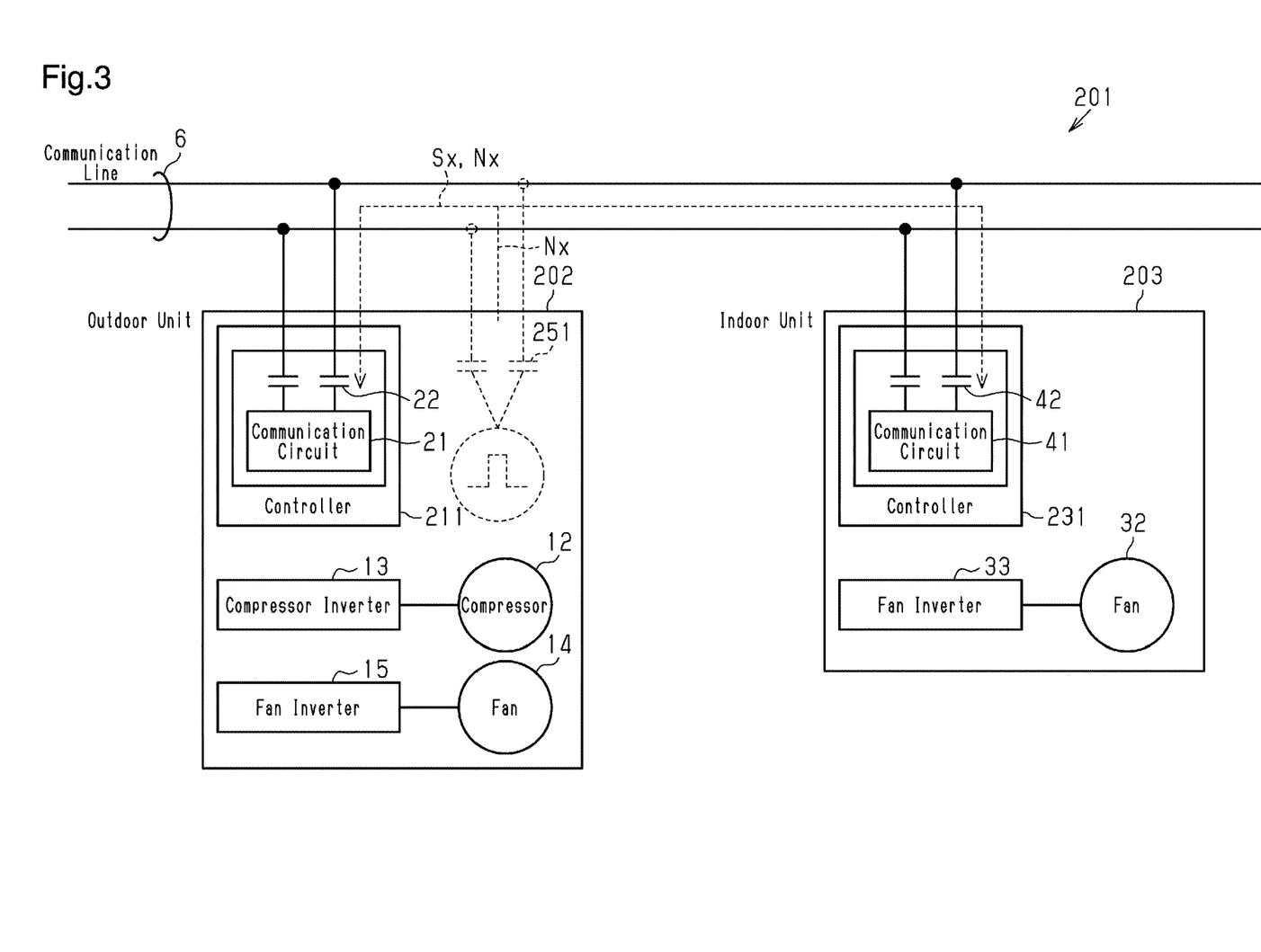
FIG. 3 is a diagram illustrating the entry of noise in the outdoor unit and the indoor unit.

FIG. 3 shows an outdoor unit 202 and an indoor unit 203, which configure an air conditioning system 201 according to a modification. The components that are the same as those of the outdoor unit 2 and the indoor unit 3 of the embodiment shown in FIG. 2 will be described with the same reference numerals.

The outdoor unit 202 of the comparative example includes a controller 211, the compressor 12, the compressor inverter 13, the fan 14, and the fan inverter 15. The controller 211 includes the communication circuit 21 and the coupling capacitor 22, and the communication circuit 21 is connected to the air conditioning communication line 6 via the coupling capacitor 22.

The indoor unit 203 includes a controller 231, the fan 32, and the fan inverter 33. The controller 231 includes the communication circuit 41 and the coupling capacitor 42, and the communication circuit 41 is connected to the air conditioning communication line 6 via the coupling capacitor 42.

The outdoor unit 202 includes the compressor inverter 13, which drives the compressor 12. The compressor inverter 13 includes a switching element used to drive the compressor 12. The ON/OFF of the switching element drives the compressor 12. The noise corresponding to the ON/OFF of the switching element is generated. In FIG. 3, the ON/OFF of the switching element is indicated by an ON/OFF waveform surrounded by a broken circle. Noise Nx (common mode noise) based on the ON/OFF of the switching element enters the air conditioning communication line 6 via a parasitic capacitance 251 and is superimposed on the communication signal transmitted via the air conditioning communication line 6.

Figure 4:
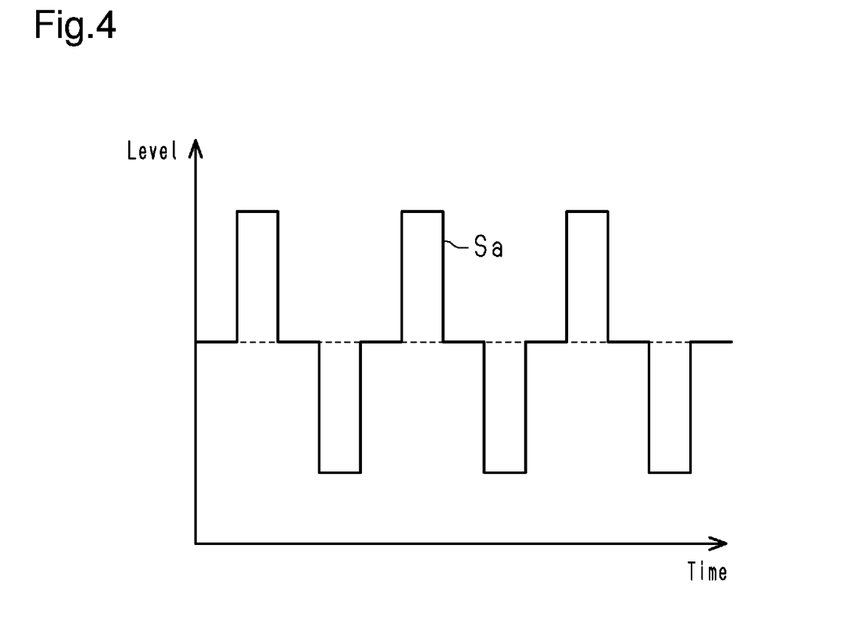
FIG. 4 is a waveform chart of a communication signal.
Figure 5:
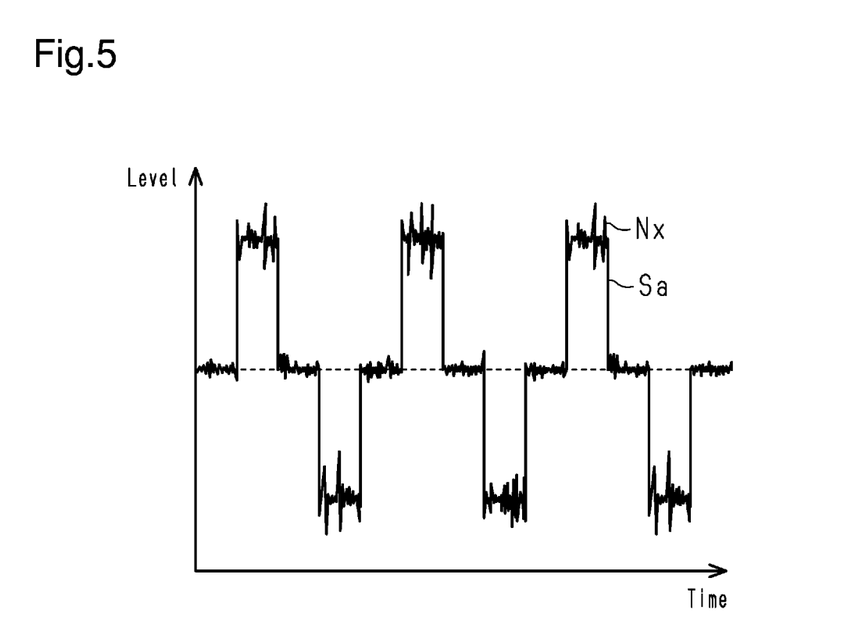
FIG. 5 is a waveform chart of the communication signal that includes noise.

FIG. 4 shows an example of the waveform of a communication signal Sa. FIG. 5 shows an example of the waveform of the communication signal Sa on which noise Nx is superimposed. In the air conditioning system, when baseband transmission is employed to encode data and transmit/receive the data, ringing that results from the influence of a switching noise of the compressor inverter 13 is superimposed on the communication signal Sa as noise Nx as shown in FIG. 5.

As shown in FIG. 3, noise Nx generated in the outdoor unit 202 is superimposed on a communication signal Sx, which is transmitted by the air conditioning communication line 6. The coupling capacitor 22, which is connected between the communication circuit 21 and the air conditioning communication line 6, includes a characteristic for passing a high-frequency component. Accordingly, the communication signal Sx including noise Nx is received by the communication circuit 21 of the outdoor unit 2. Noise Nx entering in this manner is a factor that changes the waveform of the communication signal Sx depending on the frequency and level of noise Nx to cause a communication abnormality. In the indoor unit 203, in the same manner as the outdoor unit 202, the communication signal including noise is received by the communication circuit 41 via the coupling capacitor 42, and the noise included in the received signal is a factor that causes a communication abnormality.

Figure 7:
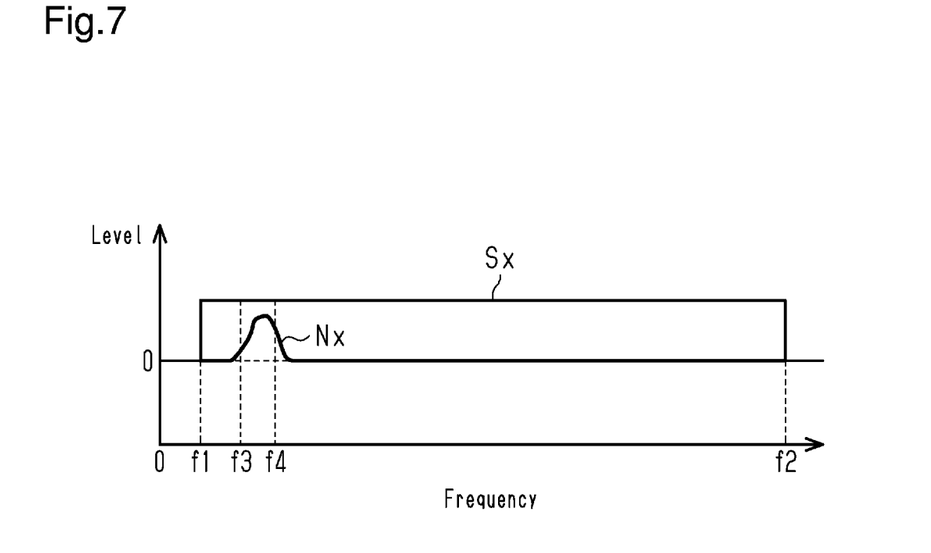
FIG. 7 is a diagram illustrating the frequency components of the communication signal and noise.

As shown in FIG. 7, a communication signal S1, which is transmitted and received to and from the outdoor unit 2 and the indoor unit 3 of the air conditioning system of the present embodiment, includes frequency components from frequency f1 to frequency f2 in a predetermined modulation method. The modulation method is, for example, an orthogonal frequency-division multiplexing (OFDM). Frequency f1 is, for example, 2 MHz. Frequency f2 is, for example, 30 MHz. Frequency f2 may be greater than or equal to 30 MHz. Noise Nx generated by driving the compressor 12 includes frequency components within a range from frequency f3 to frequency f4, which are higher than frequency f1. The inventors of the present invention have found out that when the compressor 12 is driven at a predetermined carrier frequency (for example, 6 kHz) in the air conditioning system 1, noise Nx generated by the compressor 12 includes frequency components around 5 MHz. The inventors of the present invention have also found out that the noise generated in this manner includes frequency components with a predetermined frequency width (for example, 3 MHz) and the center frequency of the predetermined frequency width changes in correspondence with the state (installed state, operating state) of the air conditioning system 1. Regarding the frequency components of noise, frequency f3 is 3 MHz and frequency f4 is 6 MHz in an example of the installation and frequency f3 is 5 MHz and frequency f4 is 8 MHz in another example of the installation. That is, the frequency components of noise change depending on the configuration with a frequency width of 3 MHz, and have a lower limit value of, for example, 3 MHz and have an upper limit value of 10 MHz. The widths of the frequency components included in noise (i.e., the frequency band of noise) may differ between devices. The inventors of the present invention have found out that the frequency band is 1 to 5 MHz. The inventors of the present invention have also found out that the generation source of noise is not limited to the above-described compressor inverter 13 and the noise that affects communication may be generated from, for example, the fan inverter 15. In addition, the inventors of the present invention have found out that the frequency band of noise generated by driving the fan inverter 15 is 15 to 20 MHz.

Operation

The air conditioning system 1 of the present embodiment includes the outdoor unit 2 and the indoor units 3, which are connected to the outdoor unit 2 by the refrigerant pipe 5 and the air conditioning communication line 6.

As shown in FIG. 2, the controller 11 of the outdoor unit 2 includes the coupling capacitor 22 and the noise-cut transformer 23, which are located between the communication circuit 21 and the air conditioning communication line 6. Among the frequency components included in the communication signal, the coupling capacitor 22 passes a high-frequency component, and the noise-cut transformer 23 passes a low-frequency component.

The frequency characteristics of the noise-cut transformer 23 can be adjusted by changing how to wind coils and changing the material of the core. Thus, a frequency component within a range corresponding to noise in the frequency components of the communication signal can be adjusted. For example, when the frequency component corresponds to the noise generated by the above-described compressor inverter 13, it is preferred that the width of the frequency component to be adjusted be, for example, 1 MHz to 5 MHz. It is preferred that the frequency component to be adjusted be set within a predetermined range (for example, 3 to 10 MHz) in correspondence with the noise in which the frequency within the predetermined range is generated in the outdoor unit 2. In this case, it is preferred that the lower limit value be set to, for example, 3 MHz and the upper limit value be set to, for example, 10 MHz. In this manner, the coupling capacitor 22 and the noise-cut transformer 23 are used to adjust the level of the frequency band (f3 to f4) corresponding to noise Nx superimposed on the communication signal S1 received from the conditioning communication line 6, thereby limiting the occurrence of a communication abnormality.

Figure 6:
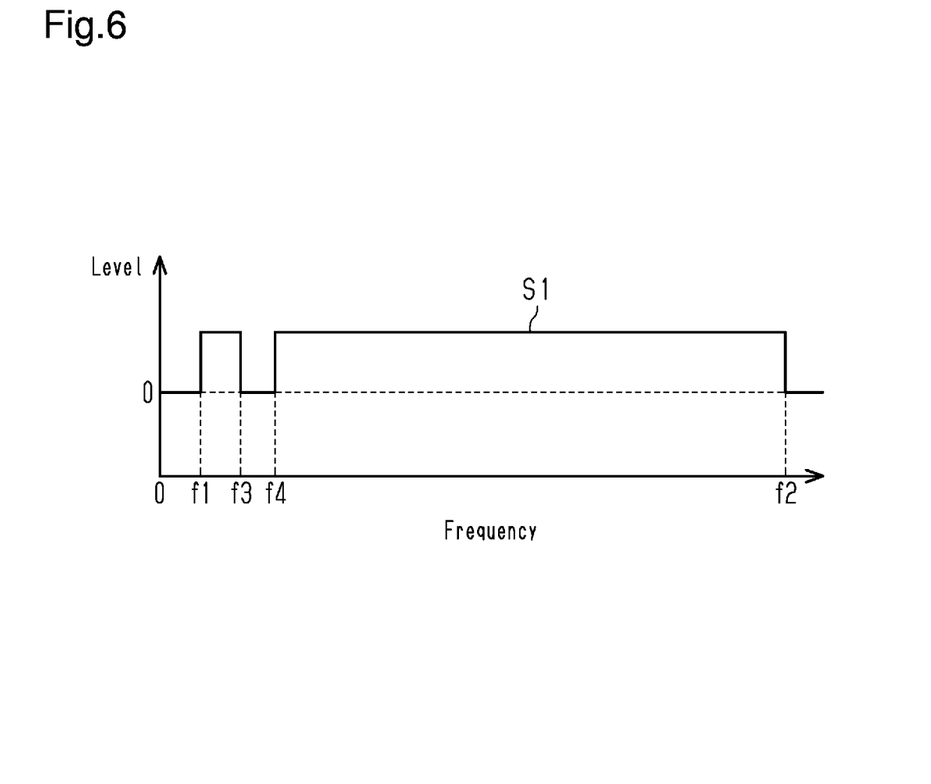
FIG. 6 is a diagram illustrating the frequency components of the communication signal in high-speed communication.

FIG. 6 shows the frequency components of the communication signal S1 that have passed through the coupling capacitor 22 and the noise-cut transformer 23. The communication signal S1 includes frequency components from frequency f1 to frequency f3 and frequency components from frequency f4 to frequency f2, and frequency components from frequency f3 to frequency f4 shown in FIG. 7 are adjusted. That is, the coupling capacitor 22 and the noise-cut transformer 23 configure a signal adjustment mechanism that adjusts a predetermined frequency component of the communication signal S1. The signal adjustment mechanism is used to adjust the signal level of the predetermined frequency component in the communication signal S1, thereby limiting the occurrence of a communication abnormality resulting from the entry of noise Nx.

As shown in FIG. 2, the controller 31 of the indoor unit 3 includes the coupling capacitor 42 and the noise-cut transformer 43, which are located between the communication circuit 41 and the air conditioning communication line 6. Among the frequency components included in the communication signal, the coupling capacitor 42 passes a high-frequency component, and the noise-cut transformer 43 passes a low-frequency component. Accordingly, in the same manner as the outdoor unit 2, in the indoor unit 3, the frequency characteristics of the coupling capacitor 42 and the noise-cut transformer 43 are adjusted to reduce the level of the frequency component corresponding to the noise generated in the outdoor unit 2. The coupling capacitor 42 and the noise-cut transformer 43 configure a signal adjustment mechanism that adjusts a predetermined frequency component of the communication signal S1. Therefore, in the indoor unit 3, the occurrence of a communication abnormality is limited.

As described above, the present embodiment has the following advantages.

(1-1) The controller 11 of the outdoor unit 2 includes the coupling capacitor 22 and the noise-cut transformer 23, which are located between the communication circuit 21 and the air conditioning communication line 6. The coupling capacitor 22 and the noise-cut transformer 23 configure a signal adjustment mechanism that adjusts a predetermined frequency component of the communication signal S1. Thus, the level of the predetermined frequency band is adjusted using the noise-cut transformer 23 to limit the influence of noise Nx superimposed on the communication signal S1 received from the air conditioning communication line 6 in the frequency band. As a result, the occurrence of a communication abnormality is limited.

(1-2) In correspondence with the frequency component of noise Nx, as the range of the frequency component to be adjusted is narrower, the communication circuit 21 receives the communication signal S1 in a waveform that is closer to the original pulse waveform. Thus, in the outdoor unit 2, a quality communication signal S1 is gained. This limits the occurrence of a communication abnormality.

(1-3) In the indoor unit 3, the frequency component corresponding to the noise generated in the outdoor unit 2 is adjusted by adjusting the frequency characteristics of the coupling capacitor 42 and the noise-cut transformer 43. The coupling capacitor 42 and the noise-cut transformer 43 configure a signal adjustment mechanism that adjusts a predetermined frequency component of the communication signal S1. Therefore, in the indoor unit 3, the occurrence of a communication abnormality is limited.

Second Embodiment

A second embodiment will now be described.

In the present embodiment, the same reference numerals are given to those components that are like or the same as the corresponding components of the first embodiment, and part of or all of the description is omitted.

Figure 8:
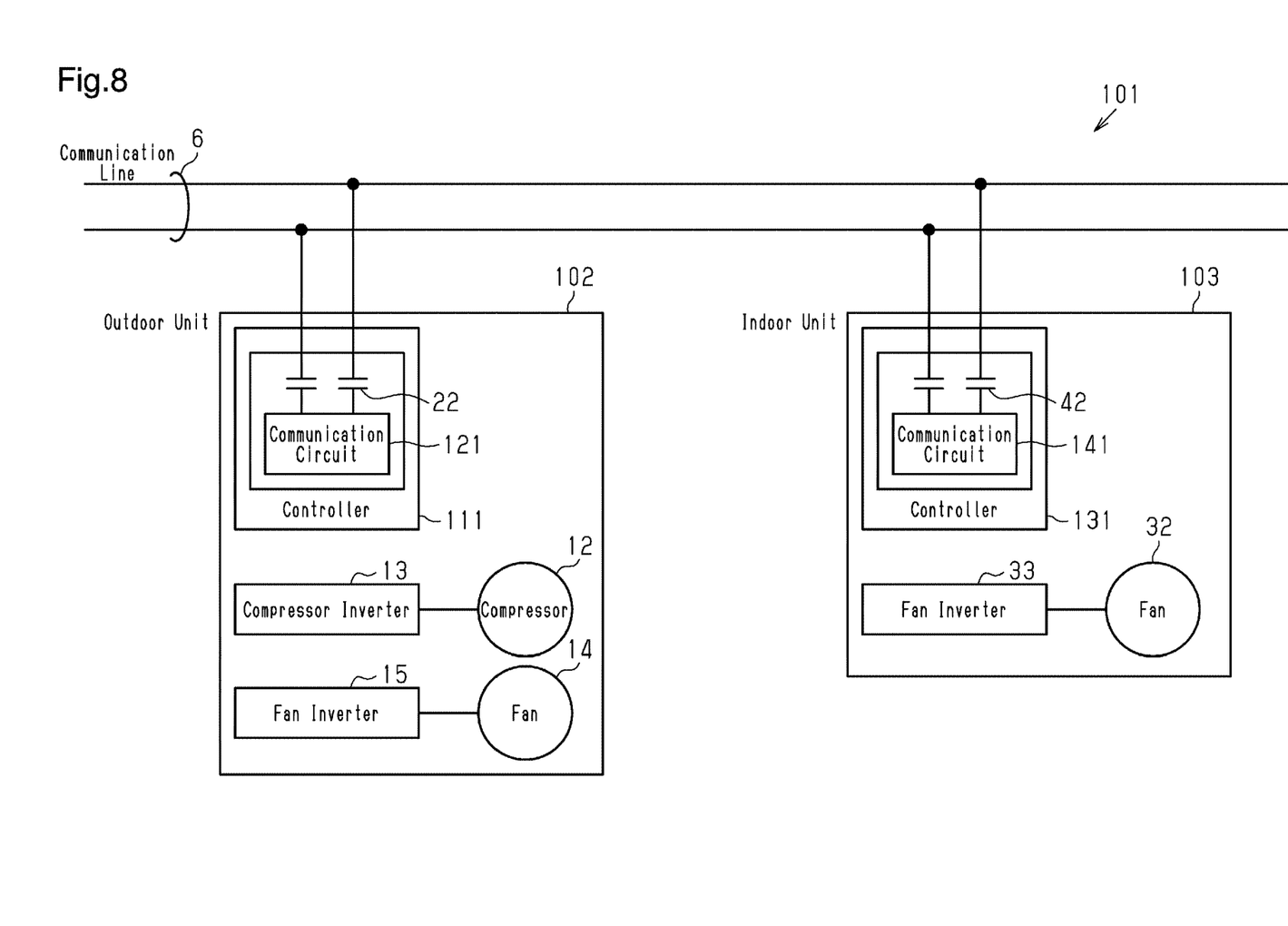
FIG. 8 is a schematic block diagram of an air conditioning system (outdoor unit and indoor unit) according to a second embodiment.

As shown in FIG. 8, an air conditioning system 101 includes an outdoor unit 102 and an indoor unit 103. The outdoor unit 102 and the indoor unit 103 are connected to each other by the conditioning communication line 6 in a communicable manner. While FIG. 8 shows one outdoor unit 102 and one indoor unit 103, multiple indoor units 103 may be connected in the same manner as the first embodiment. Alternatively, multiple outdoor units 102 and multiple indoor units 103 may be connected to each other. In addition, the system management device 4 shown in FIG. 1 may be connected.

The outdoor unit 102 includes, for example, a controller 111, the compressor 12, the fan 14, the compressor inverter 13, the fan inverter 15, a heat exchanger, and various types of valves.

The controller 111 is configured as, for example, a control board on which a microcomputer or the like is implemented. The controller 111 includes a communication circuit 121 and the coupling capacitor 22. The communication circuit 121 communicates with a communication circuit 141 of the indoor unit 103. The communication circuit 121 is connected to the air conditioning communication line 6 via the coupling capacitor 22.

The indoor unit 103 includes, for example, a controller 131, the fan 32, the fan inverter 33, a heat exchanger, and an expansion valve.

The controller 131 is configured as, for example, a control board on which a microcomputer or the like is implemented. The controller 131 includes a communication circuit 141 and the coupling capacitor 42. The communication circuit 141 communicates with the communication circuit 121 of the outdoor unit 102. The communication circuit 141 is connected to the air conditioning communication line 6 via the coupling capacitor 42.

Figure 9:
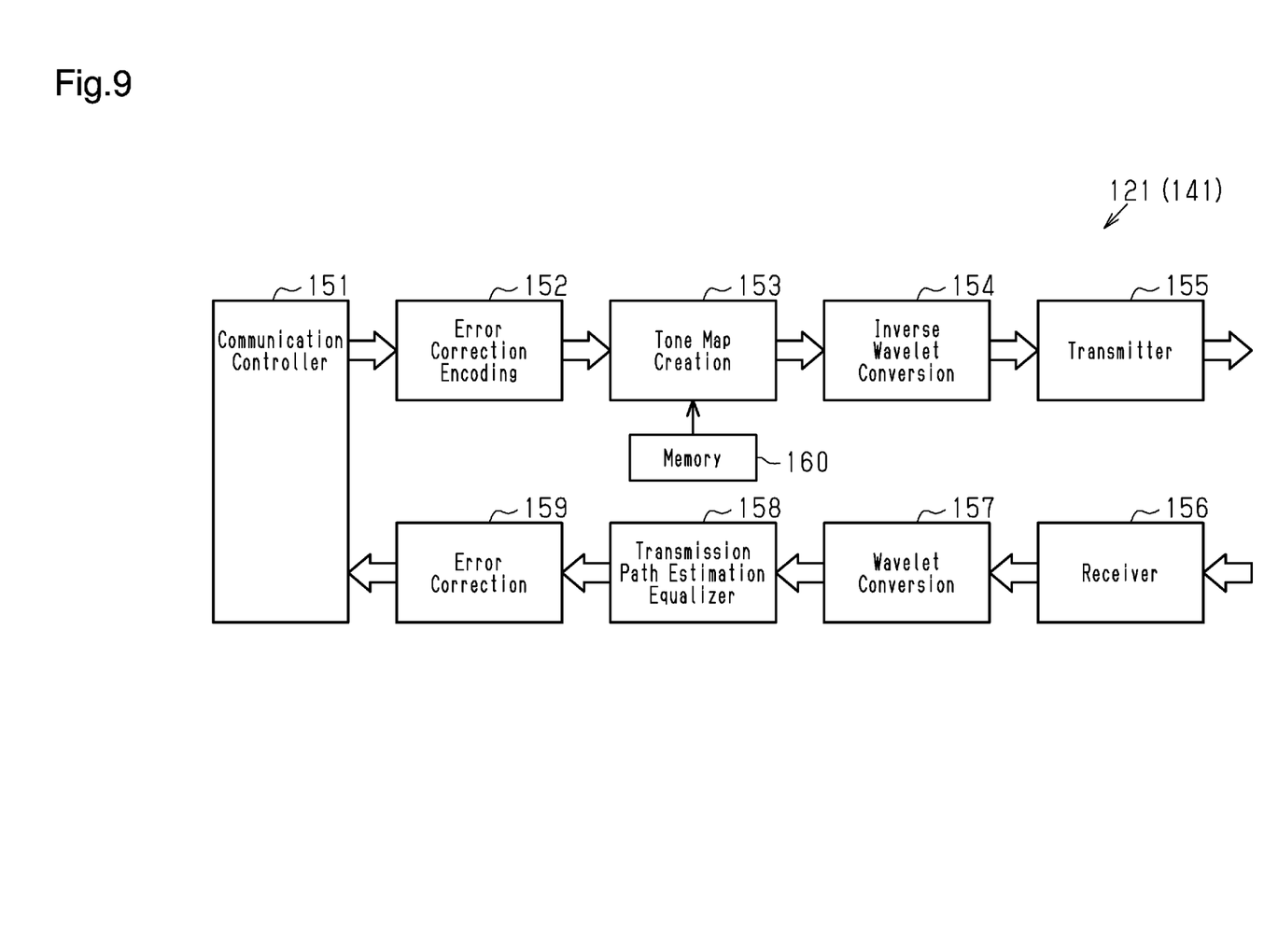
FIG. 9 is a block diagram of the communication circuit of the second embodiment.

FIG. 9 shows a block diagram of the communication circuit 121 of the outdoor unit 102 of the present embodiment. The communication circuit 141 of the indoor unit 103 has the same configuration as the communication circuit 121 of the outdoor unit 102.

The communication circuit 121 includes a communication controller 151, an error correction encoder 152, a tone map creator 153, an inverse wavelet converter 154, a transmitter 155, a receiver 156, a wavelet converter 157, a transmission path estimation equalizer 158, and an error corrector 159. The communication controller 151 is, for example, a media access control (MAC) unit. The transmitter 155 includes, for example, a digital-to-analog converter (DAC) and an amplifier (AMP). The receiver 156 includes, for example, an amplifier (PGA) and an analog-to-digital converter (ADC).

Operation data is converted into a communication signal by the communication controller 151, the error correction encoder 152, the tone map creator 153, the inverse wavelet converter 154, and the transmitter 155, and output to the air conditioning communication line 6 shown in FIG. 8. The conditioning communication line 6 transmitted by the air conditioning communication line 6 is received as operation data via the receiver 156, the wavelet converter 157, the transmission path estimation equalizer 158, the error corrector 159, and the communication controller 151.

The tone map creator 153 uses creation information, which is stored in a memory 160, to create a tone map of a predetermined carrier frequency (carrier number). The carrier frequency is, for example, 2 MHz to 30 MHz. The memory 160 stores, as the creation information, the frequency of the noise generated in the outdoor unit 102 and switch information, which indicates whether the tone map needs to be created. The frequencies of the noise are frequencies f3 and f4 of the frequency components included in the noise described in the first embodiment. The switch information is information (flag) that indicates whether to adjust a signal component in the frequency of noise. When the flag is set (for example, 1), the tone map creator 153 creates a tone map that does not include the information of a frequency component (frequency f3 to frequency f4) of the set noise in the carrier frequencies used for communication. When the flag is not set (for example, 0), the tone map creator 153 creates a tone map that includes all the information of the carrier frequencies.

The use of a tone map that does include a frequency component of noise generates a transmission signal that does not include the frequency component. Thus, since the transmission signal is unaffected by the entry of noise, the occurrence of a communication abnormality is limited.

In the present embodiment, the tone map that includes the frequency components of noise and the tone map that does not include the frequency components of noise can be switched by setting and clearing the flag in correspondence with the state of the air conditioning system 101. The amount of noise generation and the degree of noise entry differ depending on an installed state of the outdoor unit 102 and a laid state of the air conditioning communication line 6. In high-speed communication, it is preferred that all the carrier frequencies be used. Therefore, by clearing the flag in correspondence with the state of noise, a quality transmission signal is generated to enable high-speed communication. Also, by setting the flag, a transmission signal with a reduced influence of noise is generated to enable high-speed communication.

As described in the first embodiment, noise Nx generated in the outdoor unit 102 is superimposed on the communication signal transmitted to the indoor unit 103 via the air conditioning communication line 6. In the indoor unit 103, in the same manner as the outdoor unit 102, the communication signal including noise is received by the communication circuit 141, and the noise included in the received signal may result in a communication abnormality.

For example, in the air conditioning system 101, which is arranged in a building such as an office building, the refrigerant pipe 5 between the outdoor unit 102 and the indoor unit 103 is long and the air conditioning communication line 6 is accordingly long. The longer the length of the air conditioning communication line 6 between the outdoor unit 102 and the indoor unit 103, the smaller the high-frequency component included in the communication signal becomes and the smaller the S/N ratio of the communication signal becomes.

In multiple indoor units 103 connected to the air conditioning communication line 6, the influence of noise on each indoor unit 103 may differ depending on the length of the air conditioning communication line 6 from the outdoor unit 102 to each indoor unit 103 and depending on the installed state of each indoor unit 103. Accordingly, in each indoor unit 103, by using the flag, the ON/OFF of the adjustment of a frequency component used for communication can be easily set.

As described above, the present embodiment has the following advantages.

(2-1) The tone map that includes the frequency components of noise and the tone map that does not include the frequency components of noise can be switched by setting and clearing the flag in correspondence with the state of the air conditioning system 101. The amount of noise generation and the degree of noise entry differ depending on the installed state of the outdoor unit 102 and the laid state of the air conditioning communication line 6. In high-speed communication, it is preferred that all the carrier frequencies be used. Therefore, by clearing the flag in correspondence with the state of noise, a quality transmission signal is generated to enable high-speed communication. Also, by setting the flag, a transmission signal with a reduced influence of noise is generated to enable high-speed communication.

(2-2) In multiple indoor units 103 connected to the air conditioning communication line 6, the influence of noise on each indoor unit 103 may differ depending on the length of the air conditioning communication line 6 from the outdoor unit 102 to each indoor unit 103 and depending on the installed state of each indoor unit 103. Accordingly, in each indoor unit 103, by using the flag, the ON/OFF of the adjustment of a frequency component used for communication can be easily set.

Modifications

Each of the above-described embodiments may be modified as follows.

In the second embodiment, a frequency component used for communication simply needs to be adjusted. For example, a communication signal may be generated using a modulation method such as OFDM.

In the second embodiment, frequency f3 may be stored in the memory 160 and the value obtained by adding a predetermined value (for example, 3 MHz) to frequency f3 may be calculated so that the information of frequency f3 to the calculated value is not generated in the tone map creator 153. In contrast, frequency f4 may be stored in the memory 160 and the value obtained by subtracting the predetermined value (for example, 3 MHz) from frequency f4 may be calculated so that the information of frequency f4 to the calculated value is not generated in the tone map creator 153.

In addition, the center frequency of a frequency band to be adjusted may be stored in the memory 160 to adjust the signal level at a predetermined frequency band from the center frequency. Alternatively, the center frequency and the frequency width that is to be adjusted may be stored in the memory 160 to adjust the signal level.

The second embodiment may be configured to receive noise and compare the level of the noise with a threshold value so that the flag is set and cleared in correspondence with the level of the noise.

In the first embodiment, for example, a channel that bypasses the noise-cut transformers 23 and 43 and a switch in the channel may be provided so that the adjustment of a frequency component used for communication is switched between activation and deactivation by turning the switch on and off during installation. Alternatively, the switch may be turned on and off using the result of the level of determination of an instruction signal or noise during operation.

In the above-described air conditioning systems 1 and 101, communication is executed between the outdoor units 2 and 102 and the indoor units 3 and 103 via the air conditioning communication line 6. Thus, the signal level of a frequency band corresponding to noise may be adjusted in at least one of the outdoor unit and the indoor unit.

It should be understood that the above-described invention may be embodied in many other specific forms within the scope and equivalence of the appended claims.

DESCRIPTION OF THE REFERENCE NUMERALS 2, 102) Outdoor Unit
3, 103) Indoor Unit
13) Compressor Inverter
11, 31, 111, 131) Controller 21, 41, 121, 141) Communication Circuit
22, 42) Coupling Capacitor
23, 43) Noise-cut Transformer (Signal Adjustment Mechanism)
153) Tone Map Creator (Signal Adjustment Mechanism, Switching Mechanism)
160) Memory (Switching Mechanism)
S1, Sx) Communication Signal
Nx) Noise

The invention claimed is:

1. An air conditioning system, comprising:

an outdoor unit including an inverter circuit;

a plurality of indoor units connected to the outdoor unit in a communicable manner; and communication circuits provided in the outdoor unit and the plurality of indoor units, respectively, for communication between the outdoor unit and the plurality of indoor units, wherein the outdoor unit and the plurality of indoor units communicate to each other with a multi-carrier transmission using a communication signal including a plurality of carrier frequencies simultaneously, and the communication circuit of each of the plurality of indoor units is configured to:

include a flag that is set and cleared in correspondence with an influence of noise on the air conditioning system, the flag indicating whether to adjust a signal component in a frequency of the noise;

when the flag is set, generate the communication signal to limit a signal within a predetermined frequency width within a frequency region of the communication signal based on a tone map that does not include information of a pre-set frequency component of the noise in the carrier frequencies simultaneously used for communication, and when the flag is cleared, generate the communication signal based on a tone map that includes all the information of the carrier frequencies simultaneously used for communication.

2. The air conditioning system according to claim 1, wherein the communication circuit is provided on at least one of the outdoor unit or the plurality of indoor units.

3. The air conditioning system according to claim 1, wherein the multi-carrier transmission includes orthogonal frequency-division multiplexing (OFDM).

* * * * *